(12) United States Patent  
Krichevsky et al.

(10) Patent No.: US 9,064,528 B1  
(45) Date of Patent: *Jun. 23, 2015

(54) INTERFEROMETRIC WAVEGUIDE USABLE IN SHINGLED HEAT ASSISTED MAGNETIC RECORDING IN THE ABSENCE OF A NEAR-FIELD TRANSDUCER

(71) Applicant: Western Digital Technologies, Inc., Irvine, CA (US)

(72) Inventors: Alexander Krichevsky, San Jose, CA (US); Christopher B. Wolf, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,996

(22) Filed: Jun. 26, 2013

Related U.S. Application Data

(60) Provisional application No. 61/824,921, filed on May 17, 2013.

(51) Int. Cl.
  *G11B 11/00* (2006.01)
  *G11B 11/105* (2006.01)

(52) U.S. Cl.
  CPC .... *G11B 11/10576* (2013.01); *G11B 11/10536* (2013.01)

(58) Field of Classification Search
  None
  See application file for complete search history.

(56) References Cited

U.S. PATENT DOCUMENTS 5,173,909 A    12/1992   Sakano et al.

| | | |
|---|---|---|
| 5,199,090 A | 3/1993 | Bell |
| 5,341,391 A | 8/1994 | Ishimura |
| 5,960,014 A | 9/1999 | Li et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |

(Continued)

FOREIGN PATENT DOCUMENTS

| EP | 1498878 A2 | 1/2005 |
|---|---|---|
| EP | 1501076 A1 | 1/2005 |

OTHER PUBLICATIONS

Chubing Peng, "Surface-plasmon resonance of a planar lollipop near-field transducer", Applied Physics Letters 94, 171106 (2009), 3 pages.

(Continued)

*Primary Examiner* — Wayne Young
*Assistant Examiner* — Brian Butcher

(57) ABSTRACT

A heat-assisted magnetic recording (HAMR) head is coupled with a laser for providing energy and has an air-bearing surface (ABS) configured to reside in proximity to a media during use. The HAMR head includes a slider coupled with the laser and a HAMR transducer coupled with the slider. The HAMR transducer includes a write pole that writes to a region of the media, coil(s) for energizing the write pole and an interferometric waveguide (IWG) optically coupled with the laser. The IWG includes a splitter, a recombination region and arms between the splitter and the recombination region. The arms have multiple optical path lengths. The IWG is configured to provide the energy from the laser to the media by forming an interference pattern in the recombination region. An antinode of the interference pattern is at a region of the media and heats the region of the media for a write operation.

22 Claims, 8 Drawing Sheets

(56) References Cited

U.S. PATENT DOCUMENTS

| | | |
|---|---|---|
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,046,885 A | 4/2000 | Aimonetti et al. |
| 6,049,650 A | 4/2000 | Jerman et al. |
| 6,055,138 A | 4/2000 | Shi |
| 6,058,094 A | 5/2000 | Davis et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,063 B1 | 2/2001 | Cameron |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,275,453 B1 | 8/2001 | Ueyanagi et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,396,776 B1 | 5/2002 | Ueyanagi |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |

(56) References Cited

U.S. PATENT DOCUMENTS

| | | |
|---|---|---|
| 6,604,223 B1 | 8/2003 | Belser et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,671,127 B2 | 12/2003 | Hsu et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,195 B2 | 2/2004 | Miyanishi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,795,630 B2 | 9/2004 | Challener et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,834,027 B1 | 12/2004 | Sakaguchi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,810 B2 | 11/2005 | Kasiraj et al. |
| 6,969,989 B1 | 11/2005 | Mei |
| 6,975,486 B2 | 12/2005 | Chen et al. |
| 6,975,580 B2 | 12/2005 | Rettner et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,027,700 B2 | 4/2006 | Challener |
| 7,035,046 B1 | 4/2006 | Young et al. |
| 7,041,985 B1 | 5/2006 | Wang et al. |
| 7,042,810 B2 | 5/2006 | Akiyama et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,082,007 B2 | 7/2006 | Liu et al. |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,241 B2 | 11/2006 | Che et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,171,080 B2 | 1/2007 | Rausch |
| 7,177,117 B1 | 2/2007 | Jiang et al. |
| 7,190,539 B1 | 3/2007 | Nibarger |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,266,268 B2 | 9/2007 | Challener et al. |
| 7,272,079 B2 | 9/2007 | Challener |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |

(56) References Cited

U.S. PATENT DOCUMENTS

| | | |
|---|---|---|
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,330,404 B2 | 2/2008 | Peng et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,656 B2 | 5/2008 | Satoh et al. |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,394,607 B2 | 7/2008 | Ohno et al. |
| 7,408,731 B2 | 8/2008 | Uemura et al. |
| 7,412,143 B2 | 8/2008 | Rottmayer et al. |
| 7,417,813 B2 | 8/2008 | Lim et al. |
| 7,417,821 B2 | 8/2008 | Tsuchinaga |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,440,221 B2 | 10/2008 | Tsuchinaga et al. |
| 7,440,660 B1 | 10/2008 | Jin et al. |
| 7,443,625 B2 | 10/2008 | Hamaguchi et al. |
| 7,443,632 B1 | 10/2008 | Stoev et al. |
| 7,444,740 B1 | 11/2008 | Chung et al. |
| 7,486,460 B2 | 2/2009 | Tsuchinaga et al. |
| 7,486,709 B2 | 2/2009 | Hu et al. |
| 7,490,212 B2 | 2/2009 | Kasiraj et al. |
| 7,493,688 B1 | 2/2009 | Wang et al. |
| 7,500,255 B2 | 3/2009 | Seigler et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,567,387 B2 | 7/2009 | Itagi et al. |
| 7,583,466 B2 | 9/2009 | Kermiche et al. |
| 7,595,967 B1 | 9/2009 | Moon et al. |
| 7,596,072 B2 | 9/2009 | Buechel et al. |
| 7,639,457 B2 | 12/2009 | Chen et al. |
| 7,649,677 B2 | 1/2010 | Jin et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,839,497 B1 | 11/2010 | Rausch et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,672 B2 | 9/2011 | Maeda et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |

(56) References Cited

U.S. PATENT DOCUMENTS

| | | | |
|---|---|---|---|
| 8,289,821 B1 | 10/2012 | Huber | |
| 8,291,743 B1 | 10/2012 | Shi et al. | |
| 8,307,539 B1 | 11/2012 | Rudy et al. | |
| 8,307,540 B1 | 11/2012 | Tran et al. | |
| 8,308,921 B1 | 11/2012 | Hiner et al. | |
| 8,310,785 B1 | 11/2012 | Zhang et al. | |
| 8,310,901 B1 | 11/2012 | Batra et al. | |
| 8,315,019 B1 | 11/2012 | Mao et al. | |
| 8,316,527 B2 | 11/2012 | Hong et al. | |
| 8,320,076 B1 | 11/2012 | Shen et al. | |
| 8,320,077 B1 | 11/2012 | Tang et al. | |
| 8,320,219 B1 | 11/2012 | Wolf et al. | |
| 8,320,220 B1 | 11/2012 | Yuan et al. | |
| 8,320,722 B1 | 11/2012 | Yuan et al. | |
| 8,322,022 B1 | 12/2012 | Yi et al. | |
| 8,322,023 B1 | 12/2012 | Zeng et al. | |
| 8,325,569 B1 | 12/2012 | Shi et al. | |
| 8,333,008 B1 | 12/2012 | Sin et al. | |
| 8,334,093 B2 | 12/2012 | Zhang et al. | |
| 8,336,194 B2 | 12/2012 | Yuan et al. | |
| 8,339,738 B1 | 12/2012 | Tran et al. | |
| 8,341,826 B1 | 1/2013 | Jiang et al. | |
| 8,343,319 B1 | 1/2013 | Li et al. | |
| 8,343,364 B1 | 1/2013 | Gao et al. | |
| 8,349,195 B1 | 1/2013 | Si et al. | |
| 8,351,307 B1 | 1/2013 | Wolf et al. | |
| 8,357,244 B1 | 1/2013 | Zhao et al. | |
| 8,373,945 B1 | 2/2013 | Luo et al. | |
| 8,375,564 B1 | 2/2013 | Luo et al. | |
| 8,375,565 B2 | 2/2013 | Hu et al. | |
| 8,381,391 B2 | 2/2013 | Park et al. | |
| 8,385,157 B1 | 2/2013 | Champion et al. | |
| 8,385,158 B1 | 2/2013 | Hu et al. | |
| 8,394,280 B1 | 3/2013 | Wan et al. | |
| 8,400,731 B1 | 3/2013 | Li et al. | |
| 8,404,128 B1 | 3/2013 | Zhang et al. | |
| 8,404,129 B1 | 3/2013 | Luo et al. | |
| 8,405,930 B1 | 3/2013 | Li et al. | |
| 8,409,453 B1 | 4/2013 | Jiang et al. | |
| 8,413,317 B1 | 4/2013 | Wan et al. | |
| 8,416,540 B1 | 4/2013 | Li et al. | |
| 8,416,646 B2 | 4/2013 | Huang et al. | |
| 8,419,953 B1 | 4/2013 | Su et al. | |
| 8,419,954 B1 | 4/2013 | Chen et al. | |
| 8,422,171 B1 | 4/2013 | Guerini | |
| 8,422,176 B1 | 4/2013 | Leng et al. | |
| 8,422,342 B1 | 4/2013 | Lee | |
| 8,422,841 B1 | 4/2013 | Shi et al. | |
| 8,424,192 B1 | 4/2013 | Yang et al. | |
| 8,441,756 B1 | 5/2013 | Sun et al. | |
| 8,443,510 B1 | 5/2013 | Shi et al. | |
| 8,444,866 B1 | 5/2013 | Guan et al. | |
| 8,449,948 B2 | 5/2013 | Medina et al. | |
| 8,451,556 B1 | 5/2013 | Wang et al. | |
| 8,451,563 B1 | 5/2013 | Zhang et al. | |
| 8,454,846 B1 | 6/2013 | Zhou et al. | |
| 8,455,119 B1 | 6/2013 | Jiang et al. | |
| 8,456,961 B1 | 6/2013 | Wang et al. | |
| 8,456,963 B1 | 6/2013 | Hu et al. | |
| 8,456,964 B1 | 6/2013 | Yuan et al. | |
| 8,456,966 B1 | 6/2013 | Shi et al. | |
| 8,456,967 B1 | 6/2013 | Mallary | |
| 8,458,892 B2 | 6/2013 | Si et al. | |
| 8,462,592 B1 | 6/2013 | Wolf et al. | |
| 8,468,682 B1 | 6/2013 | Zhang | |
| 8,472,288 B1 | 6/2013 | Wolf et al. | |
| 8,477,571 B1 | 7/2013 | Zhou et al. | |
| 8,480,911 B1 | 7/2013 | Osugi et al. | |
| 8,486,285 B2 | 7/2013 | Zhou et al. | |
| 8,486,286 B1 | 7/2013 | Gao et al. | |
| 8,488,272 B1 | 7/2013 | Tran et al. | |
| 8,491,801 B1 | 7/2013 | Tanner et al. | |
| 8,491,802 B1 | 7/2013 | Gao et al. | |
| 8,493,693 B1 | 7/2013 | Zheng et al. | |
| 8,493,695 B1 | 7/2013 | Kaiser et al. | |
| 8,495,813 B1 | 7/2013 | Hu et al. | |
| 8,498,084 B1 | 7/2013 | Leng et al. | |
| 8,506,828 B1 | 8/2013 | Osugi et al. | |
| 8,514,517 B1 | 8/2013 | Batra et al. | |
| 8,518,279 B1 | 8/2013 | Wang et al. | |
| 8,518,832 B1 | 8/2013 | Yang et al. | |
| 8,520,336 B1 | 8/2013 | Liu et al. | |
| 8,520,337 B1 | 8/2013 | Liu et al. | |
| 8,524,068 B2 | 9/2013 | Medina et al. | |
| 8,526,275 B1 | 9/2013 | Yuan et al. | |
| 8,531,801 B1 | 9/2013 | Xiao et al. | |
| 8,532,450 B1 | 9/2013 | Wang et al. | |
| 8,533,937 B1 | 9/2013 | Wang et al. | |
| 8,537,494 B1 | 9/2013 | Pan et al. | |
| 8,537,495 B1 | 9/2013 | Luo et al. | |
| 8,537,502 B1 | 9/2013 | Park et al. | |
| 8,545,999 B1 | 10/2013 | Leng et al. | |
| 8,547,659 B1 | 10/2013 | Bai et al. | |
| 8,547,667 B1 | 10/2013 | Roy et al. | |
| 8,547,730 B1 | 10/2013 | Shen et al. | |
| 8,555,486 B1 | 10/2013 | Medina et al. | |
| 8,559,141 B1 | 10/2013 | Pakala et al. | |
| 8,563,146 B1 | 10/2013 | Zhang et al. | |
| 8,565,049 B1 | 10/2013 | Tanner et al. | |
| 8,576,517 B1 | 11/2013 | Tran et al. | |
| 8,578,594 B2 | 11/2013 | Jiang et al. | |
| 8,582,238 B1 | 11/2013 | Liu et al. | |
| 8,582,241 B1 | 11/2013 | Yu et al. | |
| 8,582,253 B1 | 11/2013 | Zheng et al. | |
| 8,588,039 B1 | 11/2013 | Shi et al. | |
| 8,593,914 B2 | 11/2013 | Wang et al. | |
| 8,597,528 B1 | 12/2013 | Roy et al. | |
| 8,599,520 B1 | 12/2013 | Liu et al. | |
| 8,599,657 B1 | 12/2013 | Lee | |
| 8,603,593 B1 | 12/2013 | Roy et al. | |
| 8,607,438 B1 | 12/2013 | Gao et al. | |
| 8,607,439 B1 | 12/2013 | Wang et al. | |
| 8,611,035 B1 | 12/2013 | Bajikar et al. | |
| 8,611,054 B1 | 12/2013 | Shang et al. | |
| 8,611,055 B1 | 12/2013 | Pakala et al. | |
| 8,614,864 B1 | 12/2013 | Hong et al. | |
| 8,619,512 B1 | 12/2013 | Yuan et al. | |
| 8,625,233 B1 | 1/2014 | Ji et al. | |
| 8,625,941 B1 | 1/2014 | Shi et al. | |
| 8,628,672 B1 | 1/2014 | Si et al. | |
| 8,630,068 B1 | 1/2014 | Mauri et al. | |
| 8,634,280 B1 | 1/2014 | Wang et al. | |
| 8,638,529 B1 | 1/2014 | Leng et al. | |
| 8,643,980 B1 | 2/2014 | Fowler et al. | |
| 8,649,123 B1 | 2/2014 | Zhang et al. | |
| 8,665,561 B1 | 3/2014 | Knutson et al. | |
| 8,670,211 B1 | 3/2014 | Sun et al. | |
| 8,670,213 B1 | 3/2014 | Zeng et al. | |
| 8,670,214 B1 | 3/2014 | Knutson et al. | |
| 8,670,294 B1 * | 3/2014 | Shi et al. | 369/13.24 |
| 8,670,295 B1 | 3/2014 | Hu et al. | |
| 8,675,318 B1 | 3/2014 | Ho et al. | |
| 8,675,455 B1 * | 3/2014 | Krichevsky et al. | 369/13.24 |
| 8,681,594 B1 | 3/2014 | Shi et al. | |
| 8,689,430 B1 | 4/2014 | Chen et al. | |
| 8,693,141 B1 | 4/2014 | Elliott et al. | |
| 8,703,397 B1 | 4/2014 | Zeng et al. | |
| 8,705,205 B1 | 4/2014 | Li et al. | |
| 2001/0006435 A1 | 7/2001 | Ichihara et al. | |
| 2001/0017820 A1 | 8/2001 | Akiyama et al. | |
| 2003/0113064 A1 | 6/2003 | Poladian et al. | |
| 2003/0184903 A1 | 10/2003 | Challener | |
| 2003/0198146 A1 | 10/2003 | Rottmayer et al. | |
| 2004/0001394 A1 | 1/2004 | Challener et al. | |
| 2004/0001420 A1 | 1/2004 | Challener | |
| 2004/0008943 A1 | 1/2004 | Berini | |
| 2004/0027728 A1 | 2/2004 | Coffey et al. | |
| 2004/0228022 A1 | 11/2004 | Ueyanagi | |
| 2005/0047013 A1 | 3/2005 | Le et al. | |
| 2005/0058425 A1 | 3/2005 | Berini et al. | |
| 2005/0069298 A1 | 3/2005 | Kasiraj et al. | |
| 2005/0071537 A1 | 3/2005 | New et al. | |
| 2005/0078565 A1 | 4/2005 | Peng et al. | |
| 2005/0122850 A1 | 6/2005 | Challener et al. | |

(56) References Cited

U.S. PATENT DOCUMENTS

| | | |
|---|---|---|
| 2005/0157597 A1 | 7/2005 | Sendur et al. |
| 2005/0289576 A1 | 12/2005 | Challener |
| 2006/0012907 A1 | 1/2006 | Ozue |
| 2006/0105203 A1 | 5/2006 | Li et al. |
| 2006/0114781 A1 | 6/2006 | Lee |
| 2006/0205092 A1 | 9/2006 | Lackritz et al. |
| 2006/0232874 A1 | 10/2006 | Tsuchinaga et al. |
| 2007/0030588 A1 | 2/2007 | Tsuchinaga et al. |
| 2007/0058281 A1 | 3/2007 | Ohno et al. |
| 2007/0081426 A1 | 4/2007 | Lee et al. |
| 2007/0081427 A1 | 4/2007 | Suh et al. |
| 2007/0223132 A1 | 9/2007 | Tsuchinaga |
| 2007/0279791 A1 | 12/2007 | Mallary |
| 2008/0013912 A1 | 1/2008 | Shukh et al. |
| 2008/0055343 A1 | 3/2008 | Cho et al. |
| 2008/0180827 A1 | 7/2008 | Zhu et al. |
| 2008/0181560 A1 | 7/2008 | Suh et al. |
| 2008/0198496 A1 | 8/2008 | Shimazawa et al. |
| 2008/0204916 A1* | 8/2008 | Matsumoto et al. ............ 360/59 |
| 2008/0212228 A1 | 9/2008 | Shibano |
| 2008/0232225 A1 | 9/2008 | Cho et al. |
| 2009/0237671 A1 | 9/2009 | Verschuren |
| 2010/0074062 A1 | 3/2010 | Kamijima et al. |
| 2010/0290157 A1 | 11/2010 | Zhang et al. |
| 2011/0086240 A1 | 4/2011 | Xiang et al. |
| 2011/0235480 A1 | 9/2011 | Goulakov et al. |
| 2012/0020195 A1 | 1/2012 | Seigler |
| 2012/0039155 A1 | 2/2012 | Peng et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2014/0133283 A1* | 5/2014 | Maletzky et al. .......... 369/13.33 |

OTHER PUBLICATIONS

Luennemann, et al., "Electrooptic properties of lithium niobate crystals for extremely high external electric fields", Appl. Phys. B 76, 403-406 (2003).

Challener, et al., "Miniature planar solid immersion mirror with focused spot less than a quarter wavelengt", Optics Express, vol. 13. No. 18, Sep. 5, 2005, 9 pages.

Rottmayer, et al., Heat-Assisted Magnetic Recording, IEEEE Transactions on Magnetics, vol. 42, No. 10, Oct. 2006, 5 pages.

Seigler, et al., "Integrated Heat Assisted Magnetic Recording Head: Design and Recording Demonstration", IEEE Transactions on Magnetics, vol. 44, No. 1, Jan. 2008, 6 pages.

* cited by examiner

INTERFEROMETRIC WAVEGUIDE USABLE IN SHINGLED HEAT ASSISTED MAGNETIC RECORDING IN THE ABSENCE OF A NEAR-FIELD TRANSDUCER

CROSS-REFERENCE TO RELATED APPLICATIONS

This application claims priority to provisional U.S. Patent Application Ser. No. 61/824,921, filed on May 17, 2013, which is hereby incorporated by reference in its entirety.

BACKGROUND

FIG. 1 depicts a side view of a portion a conventional HAMR disk drive 100. For clarity, FIG. 1 is not to scale. For simplicity not all portions of the conventional HAMR disk drive 10 are shown. The HAMR disk drive 10 includes media 12, a HAMR head 14, and a laser assembly 30. The conventional HAMR head 14 includes a slider 15, a HAMR transducer 20. Although not shown, the slider 15 and thus the laser assembly 30 and HAMR transducer 20 are generally attached to a suspension (not shown). The HAMR transducer 20 includes an air-bearing surface (ABS) proximate to the media 12 during use. The HAMR transducer 12 includes a waveguide 22, write pole 24, coil(s) 26 and near-field transducer (NFT) 28. The waveguide 22 guides light to the NFT 28, which resides near the ABS. The NFT 28 focuses the light to magnetic recording media 12, heating a region of the magnetic media 12 at which data are desired to be recorded. High density bits can be written on a high coercivity medium with the pole 24 energized by the coils 26 to a modest magnetic field.

Although the conventional HAMR disk drive 10 functions, there are drawbacks. The conventional HAMR head 20 may be desired to operate at skew, for example in shingled or other types of magnetic recording. At skew, the HAMR transducer 20 is angled with respect to the track being written. For example, if the pole 24 has a rectangular profile at the ABS, the top and bottom of the rectangle may be at a nonzero angle with respect to the tracks being written. At skew, the region of the media 12 heated by the NFT 28 may be misaligned with the region of the media written by the pole 24. Thus, performance of the HAMR transducer 10 may be adversely affected.

It is noted that early prototypes of a HAMR transducer 20 used a near-parabolic Plain Solid Immersion Mirror (PSIM) as a waveguide 22 to directly heat the media 12 in the absence of the NFT 28. Such a design utilized blue (488 nm) light. The spot size for such a conventional HAMR transducer was reported as one hundred and twenty-four nanometers at full width half max (FWHM). However, such a spot size is not at the theoretical limit of ¼λ for optical systems. Typically, the ¼λ limit refers to the wavelength of light in the optical system. The wavelength of light within the waveguide 22 is λ/n, where λ is the wavelength in vacuum and n is the mode propagation index (a value between the indices of refraction of the waveguide core and its cladding) typically around 1.6 (SiO2 cladding) 1.7 (Al2O3 cladding). For blue light in using such a medium as the waveguide/PSIM, the ¼λ limit would be approximately 59-63 nm. Thus, omitting the NFT 28, such a system may not approach the limit for optical systems. In addition, such a system may still suffer from issues due to skew.

Accordingly, what is needed is an improved HAMR transducer.

DETAILED DESCRIPTION OF THE PREFERRED EMBODIMENTS

Figure 2:
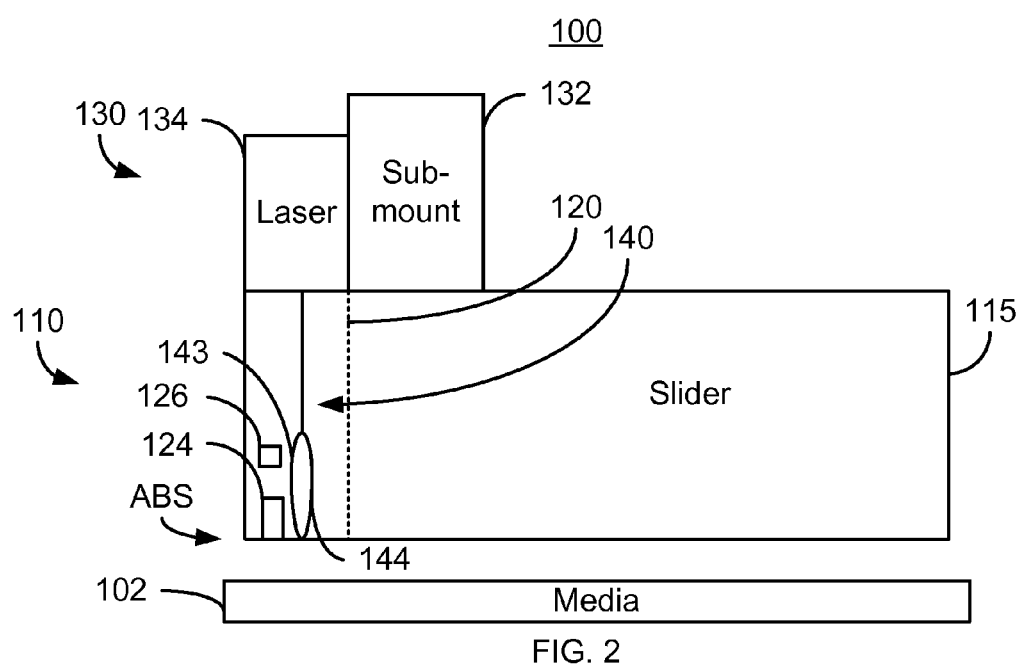
FIG. 2 depicts an exemplary embodiment of a heat assisted magnetic recording disk drive.
Figure 3A:
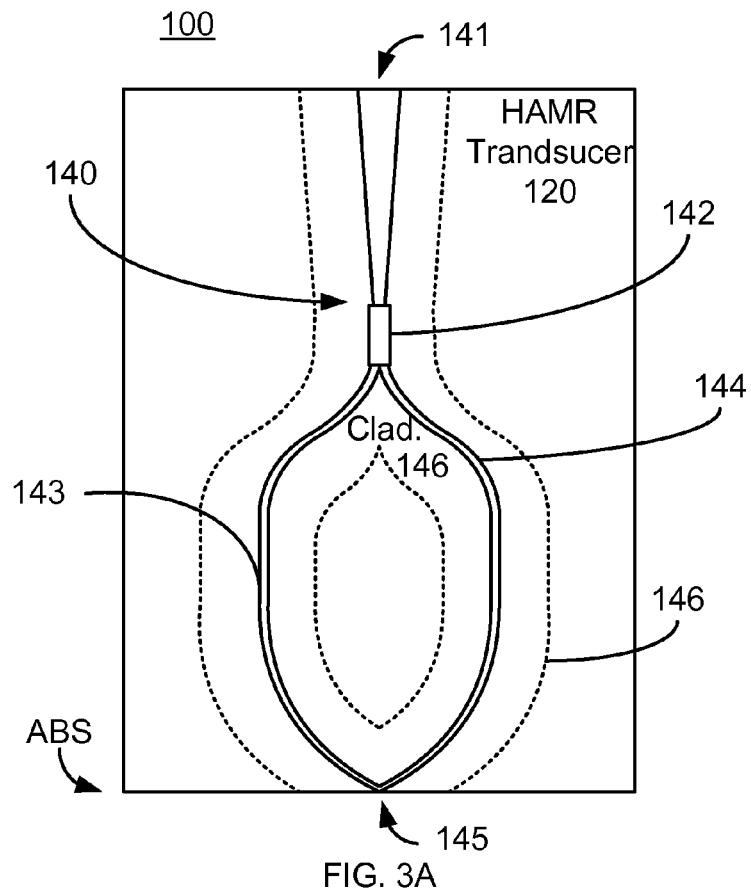
FIGS. 3A-3C depicts an exemplary embodiment of a portion of a heat assisted magnetic recording disk drive.
Figure 3B:
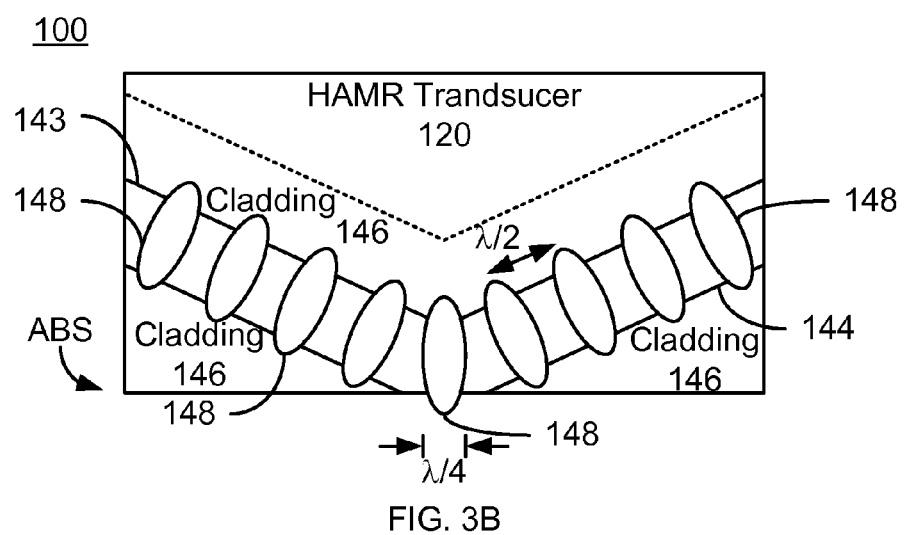
Figure 3C:
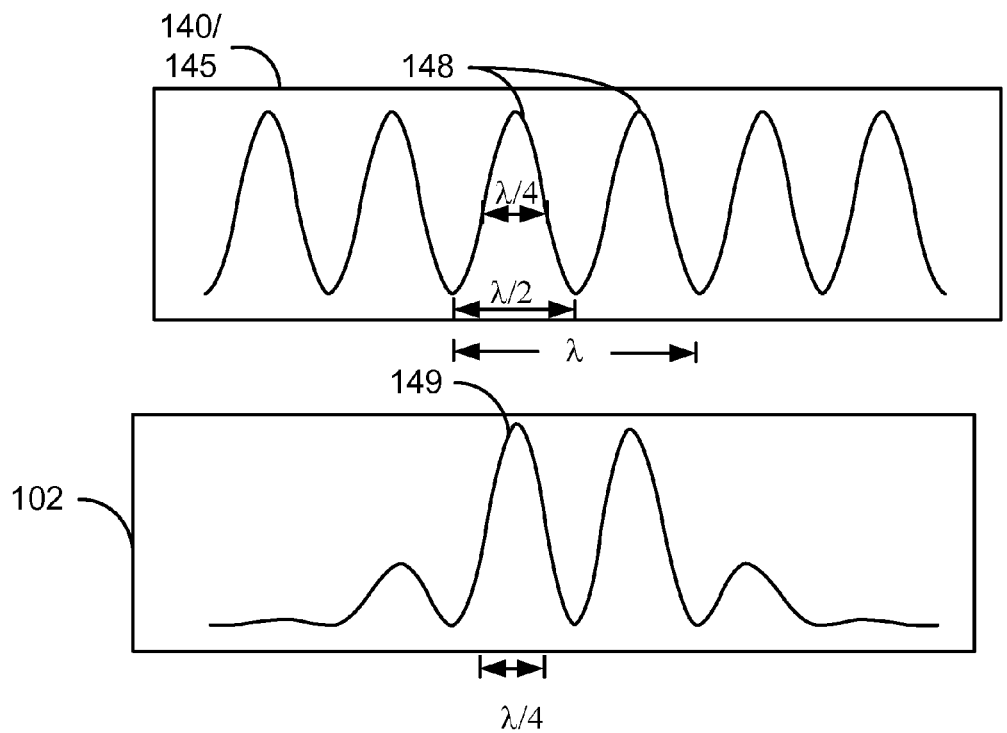

FIGS. 2, 3A, 3B and 3C depict an exemplary embodiment of a portion of a HAMR disk drive 100. FIG. 2 depicts a side view of the HAMR disk drive 100. FIG. 3A depicts a portion of the HAMR disk drive 100 including the waveguide. FIG. 3B depicts a portion of the waveguide. FIG. 3C depicts light intensity/temperature of a portion of the waveguide and a portion of the media. For clarity, FIGS. 2-3C are not to scale. For simplicity not all portions of the HAMR disk drive 100 are shown. In addition, although the HAMR disk drive 100 is depicted in the context of particular components other and/or different components may be used. For example, circuitry used to drive and control various portions of the HAMR disk drive 100 is not shown. For simplicity, only single components 102, 110, 115, 120, 130 and 140 are shown. However, multiples of each components 102, 110, 115, 120, 130 and/or 140 and their sub-components, might be used.

The HAMR disk drive 100 includes media 102, a slider 115, a HAMR head 110, and a laser assembly 130. Additional and/or different components may be included in the HAMR disk drive 100. The HAMR head 110 includes a slider 115 and a HAMR transducer. Although not shown, the slider 115, and thus the laser assembly 130 and HAMR transducer 120 are generally attached to a suspension (not shown). The HAMR transducer 120 is fabricated on the slider 115 and includes an ABS proximate to the media 102 during use. In general, the HAMR head 120 includes a write transducer and a read transducer. However, for clarity, only the write portion of the HAMR head 120 is shown. The HAMR head 120 includes a waveguide 140, write pole 124 and coil(s) 126. In other embodiments, different and/or additional components may be used in the HAMR head 120. For example, although not shown in FIGS. 2-3B, an optional NFT may be included in other embodiments.

Figure 1:
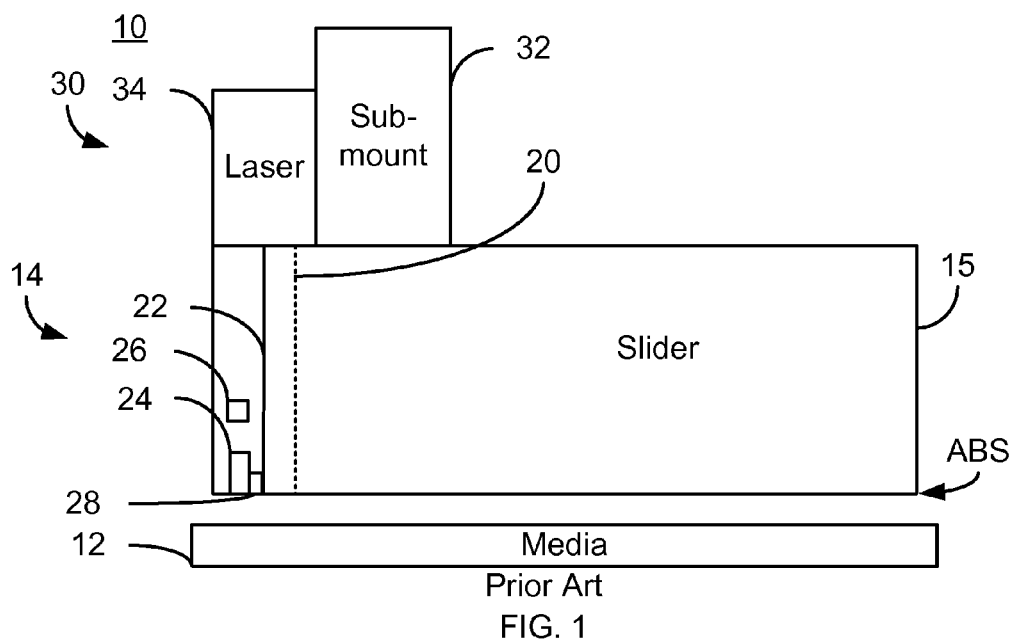
FIG. 1 is a diagram depicting a plan view of a conventional HAMR transducer.

The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode. Thus, the laser 134 typically includes at least a resonance cavity, a gain reflector on one end of the cavity, a partial reflector on the other end of the cavity and a gain medium. For simplicity, these components of the laser 134 are not shown in FIG. 1. In some embodiments, the laser 134 may be an edge emitting laser, a vertical surface emitting laser (VCSEL) or other laser. The laser 134 emits energy on a side/edge facing the waveguide 122. The combination of the laser 134 provides light energy to the waveguide 122. In some embodiments, the laser 134 is desired to provide energy having a wavelength shorter than that of red light. In some cases, a laser that emits blue light. In some embodiments, the wavelength of energy from the laser 134 is not more than five hundred nanometers.

As can be seen in FIGS. 3A and 3B, the waveguide 140 is an interferometric waveguide (IWG) 140 and may be used without an NFT. The IWG 100 includes an entrance 141, a splitter 142, arms 143 and 144 and a recombination region 145. Note that in FIGS. 2-3B, the core of the IWG 140 is drawn and labeled. The cladding 146 that surrounds the core/IWG 140 is not labeled in FIG. 2, but is indicated by a dotted line in FIGS. 3A-3B. The IWG 140 is optically coupled with the laser 134, receiving light at the entrance 141. In some embodiments, the IWG 140 is a tapered interferometric waveguide (ITWG). Thus, as is shown in FIG. 3A, the waveguide 140 tapers to a smaller size from the entrance 141, thus confining the mode propagated by the waveguide. The arms 143 and 144 have different optical path lengths. Thus, light from the laser is split to the two arms 143 and 144, traveling different distances to the recombination region 145. As a result, the IWG 140 provides an interference pattern in the recombination region 145. The interference pattern includes antinodes 148 and nodes (regions of zero/near zero intensity). For simplicity, only three antinodes 148 are labeled in FIG. 3B, though nine are present in the drawing. Only a portion of the antinodes 148 that may be present in the HAMR disk drive 100 are depicted. An antinode of the interference pattern intersects a region of the media 102, heating the region of the media 102 for a write operation. In the embodiment shown in FIGS. 2-3C, the antinode 148 at the ABS as well as adjacent antinodes 148 may heat the media 102. For example, the interference pattern having antinodes 148 in the waveguide 140/recombination region 145 and the corresponding temperature profile are shown in FIG. 3C. In some embodiments, the IWG 140 is configured such that one of the antinodes 148 resides at the leading edge of the write pole 124. Such a configuration may be used for shingled recording. However, the IWG 140 may be configured such that the antinodes 148 are located elsewhere.

The antinodes 140 may have a spot size that approaches the ¼λ limit and which is small enough to enable higher recording densities. For a standing wave the period of oscillation of the energy density is λ/2, as is shown in FIGS. 3B and 3C. Stated differently, the distance between antinodes 148 (or nodes) is λ/2. The width of sine wave at half-maximum is half of its period. Thus, the FWHM of the antinodes 148 (the portion of the antinodes 148 shown) is ¼λ. Shallow angle V-structure of the recombination region 145 should not significantly alter the FWHM of the antinodes 148. In some embodiments, the angle shift due to the V-structure of the recombination region 145 may induce a second-order effect proportional to the cosine of a small angle. However, to first order, it is believed that the spot size of the antinodes 140 may be approximately ¼λ. The region heated by the antinodes 148 also has a light intensity/temperature peak 149 having a width on the order of λ/4. In order to achieve a spot size in the same range as provided with an NFT as in the conventional HAMR disk drive, a laser 134 emitting blue light of light of a shorter wavelength may be used.

In some embodiments, the transducer 120 is configured such that the path lengths of one or more of the arms 143 and 144 may be changed during operation of the transducer 120. As a result the optical path difference between the arms 143 and 144 is tunable. This control over the optical path differences allows a location of an antinode 148 with respect to the write pole 124 to be adjusted. There are a number of ways in which the optical path length(s) of the arm(s) 143 and 144 may be controlled. For example, some combination of the physical path length, the index of refraction, and/or other optical properties of the IWG 140 may be adjusted to provide the desired interference pattern. Stated differently, the desired locations of the antinodes 148 may be tuned. For example, a heater may be used to head a portion of one of the arms 143 and 144. As the arm 143 or 144 heats, there is typically a physical expansion governed by the coefficient of thermal expansion. In addition, the index of refraction of the region may change. The optical path length for that arm may thus be changed. In other embodiments, the use of electro-optic material(s) in the IWG 140 may allow the index of refraction only to be changed. In some embodiments, one of the arms 143 or 144 has its optical path length changed. In other embodiments, both of the arms 143 and 144 may have their optical path length changed. In other embodiments, at least part of the IWG 140 may reside on a carrier layer having a high coefficient of thermal expansion. Heating of the carrier layer may change the size not only of the carrier layer but also of the IWG 140. Thus, the optical path length(s) may be changed. Further, a heater may be located at or near the laser to adjust the wavelength of the emitted light. Changing the wavelength changes the location of the antinodes 148 in the interference pattern. Thus, the locations and spacing between the antinodes 148 (and thus the nodes) in the interference pattern of the IWG 140 may be tuned during operation of the HAMR disk drive 100.

As discussed above, the IWG 140 may be configured such that one or more of the antinodes 148 directly heats the media 102 without the use of an NFT in the HAMR transducer 120. Thus, the spot size indicated by the FWHM of the antinodes 148 may set the size of the spot that heats the media. In some embodiments, the IWG 140 may be configured to improve confinement of the antinodes 148. Improved confinement of the spot size for the antinodes 148 may improve the thermal gradient for the region of the media heated by the antinode(s) 148. Thus, the IWG 140 may be configured such that the spot/antinode 148 on the media 102 has improved confinement. In some embodiments, high contrasts in index of refraction for the core 140 and cladding 146 may be used to improve confinement. This may be achieved by using material(s) having a high index of refraction for the core 140. A high index of refraction is an index of refraction that is greater than 2. In some embodiments, the index of refraction is desired to be greater than 2.2. In some such embodiments, the index of refraction of the core 140 is desired to be greater than 2.4. The use of birefringent material(s) may also improve confinement of the spot for the IWG 140. For example, titanium dioxide (rutile) transparent at and below 430 nm (n=2.87 for the ordinary ray at a wavelength of 430), strontium titanate (SrTiO3, n=2.54 for a wavelength of 450 nm) and lead titanate (PbTiO3, n=2.85 for a wavelength of 450 nm) transparent at and above 450 nm may be used for the core of the IWG 140. Other birefringent materials having the desired properties in the wavelength range of interest may also be used. Further if regions of the IWG 140, such as those near the recombination region 140, are grown as a single crystal the enormous refraction index of rutile for the extraordinary ray (n=3.24 for a wavelength of 430 nm) may be exploited. More specifically, the extraordinary ray may exhibit high confinement. In other embodiments, the ordinary ray may have a higher index of refraction and, therefore, have improved confinement. Judicious use of the TM mode or the TE mode may offer superior confinement of the antinode 148 in the down track or cross track direction For example, rutile may have a TM mode that offers superior down track confinement of the antinode 148. The effective index of refraction is lower for TM mode than for TE mode. The spacing between the antinodes 148 is wider for the TM mode than for the TE mode. The increased down track confinement may provide a higher thermal gradient in the down track direction. The lower index of refraction provides a higher spacing between antinodes 148, reducing the probability of neighboring track erasure. In addition, the cross track confinement and thermal gradient may still be sufficient for recording in the desired modes.

In operation, the laser 134 emits light that is provided to the waveguide 140. The waveguide 140 both directs the light toward the ABS and splits the light into the two arms 143 and 144. Because of the recombination region 145, a standing wave having antinodes 148 is formed. An antinode 148 of the standing wave may directly heat the media 102. Thus, the use of an NFT may be avoided. As discussed above, the spot size, beam confinement, and thermal gradient at the media 102 may be sufficient for recording. Stated differently, the antinode 148 may heat the recording medium layer above the Curie point on the sub-nanosecond scale. Further, the location of the antinode 148 may be tuned, for example to adjust for skew. High density bits can be written on a high coercivity medium with the pole 124 energized by the coils 126 to a modest magnetic field.

The HAMR disk drive 100 may have improved performance and manufacturability. The IWG 140 provides an interference pattern with antinodes that may directly heat the region of the media 102 to be recorded. Thus, an NFT may be omitted. An NFT typically has sections that are at or near the limits of current manufacturing techniques. The NFT is also typically subject to damage due to heating. Because the NFT may be omitted, fabrication of the HAMR transducer 120 may be simplified and the HAMR transducer 120 may be made more robust and reliable. Because the IWG 140 may adjust the location of the antinodes 148, the HAMR transducer 140 may account for skew or manufacturing issues such as the misalignment of the laser 134. Thus, performance and manufacturability of the HAMR transducer 120 may be improved.

Figure 4A:
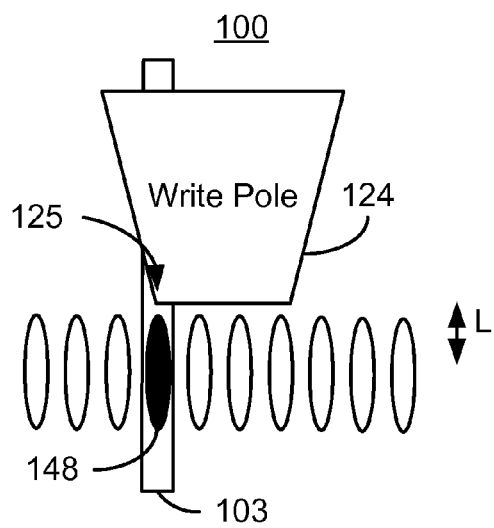
FIGS. 4A-4C depicts an exemplary embodiment of a portion of a HAMR disk drive during skew adjustment.
Figure 4B:
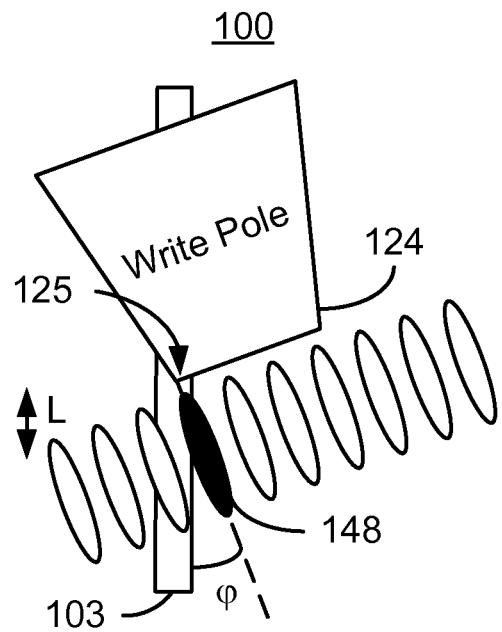
Figure 4C:
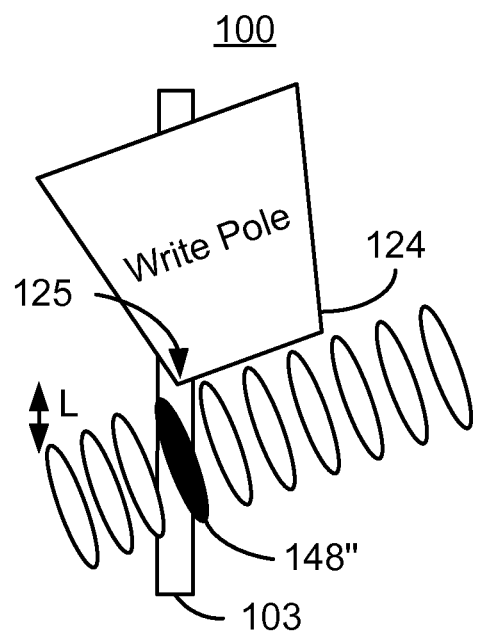

FIGS. 4A-4C depict an exemplary embodiment of a portion of a HAMR disk drive 100 that adjusts for skew. For clarity, FIGS. 4A-4C are not to scale. The HAMR disk drive 100 depicted in FIGS. 4A-4C is analogous to the HAMR disk drive depicted in FIGS. 2-3C. However, for clarity, only the write pole 124, antinodes 148 and track 103 of the media 102 are shown. In the embodiment shown, the bottom of the pole 124 is spaced apart from the recording layer of media by a distance L. In the embodiment shown, the central region of the antinode 148 (and thus the region of the media heated) is depicted as being at the distance L from the write pole 124. In other embodiments FIG. 4A depicts the disk drive 100 at a zero skew angle. In the embodiment shown, the leading edge 125 is desired to be used in writing. For example, the HAMR disk drive 100 may write using a shingled recording scheme. Because the leading edge 125 of the pole 124 is used in writing, a particular antinode 148 (shown in black in FIGS. 4A-4C) is aligned with both the pole leading edge 125 and the track 103 at zero skew.

The skew angle then changes. For example, the transducer may simply be moved to a new location closer to or further from edge of the media. FIG. 4B depicts the HAMR disk drive 100 after the change in skew angle to a nonzero skew. Such a situation is depicted in FIG. 4B. The pole 124 is at a skew angle φ. As a result, the location of the antinode 148 has been shifted from the track 103 by a distance L tan φ. Although the track 103 remains aligned with the leading edge 125 of the pole 124, the antinode 148 is no longer aligned with the track 103. In some embodiments, L is on the order of 200 nm, which corresponds to a shift of over fifty nanometers for a fifteen degree skew angle φ. However, in other embodiments, for example in which a laser 134 emitting blue light is used, L may be reduced, for example to 125 nm. In addition, assuming an asymmetric skew from the outside diameter of the disk 102 to the inside diameter, the shift may be reduced. For example, in some embodiments, the shift may be on the order of twenty nanometers or less.

In order to align the antinode 148 with the track 125 and the leading edge 125 of the pole 124, the optical path length(s) of one or both of the arms 143 and 144 are shifted. This may be accomplished by one or more of the mechanisms described herein and/or a different mechanism. As can be seen in FIG. 4C, the antinode 148" has shifted location such that the antinode 148" is aligned with both the pole 124 leading edge 125 and the track 103. This correction is facilitated by the use of shorter wavelength (e.g. blue) light for the laser 134 and the elimination of the NFT, both of which may reduce the misalignment shift shown in FIG. 4B. The correction may be further facilitated by the asymmetric skew, which also reduces the misalignment shift. Thus, the position of the antinode may be tuned to account for the misalignment shift.

Thus, using the path lengths the location of the antinode 148/148" may be adjusted. The region of the media 103 heated by the antinode 148/148" may be aligned to the desired portion of the transducer 120. In the embodiment depicted in FIGS. 4A-4C, the desired position is aligned with the track 103 and the leading edge 125 of the pole 124. However, in other embodiments, the antinodes 148 may be aligned with other features. In other embodiments, the positions of the antinodes 148 may be adjusted for additional and/or other reasons. It is noted that for the conventional HAMR transducer 10, even if the location of the light could be adjusted with respect to the NFT, the position of the spot size on the media due to the NFT cannot be tuned. Thus, in contrast to the conventional HAMR disk drive, the present mechanism provides a method for moving the spot/heated location on the media with respect to the pole. As a result, skew and/or other alignment issues may be accounted for. Further, the spot size may be sufficiently small due to the use of birefringent material(s), high index of refraction contrast between the core and cladding, the use of a lower wavelength light source, and/or other mechanisms. Thus, performance and manufacturability of the transducer 100 may be enhanced.

Figure 5A:
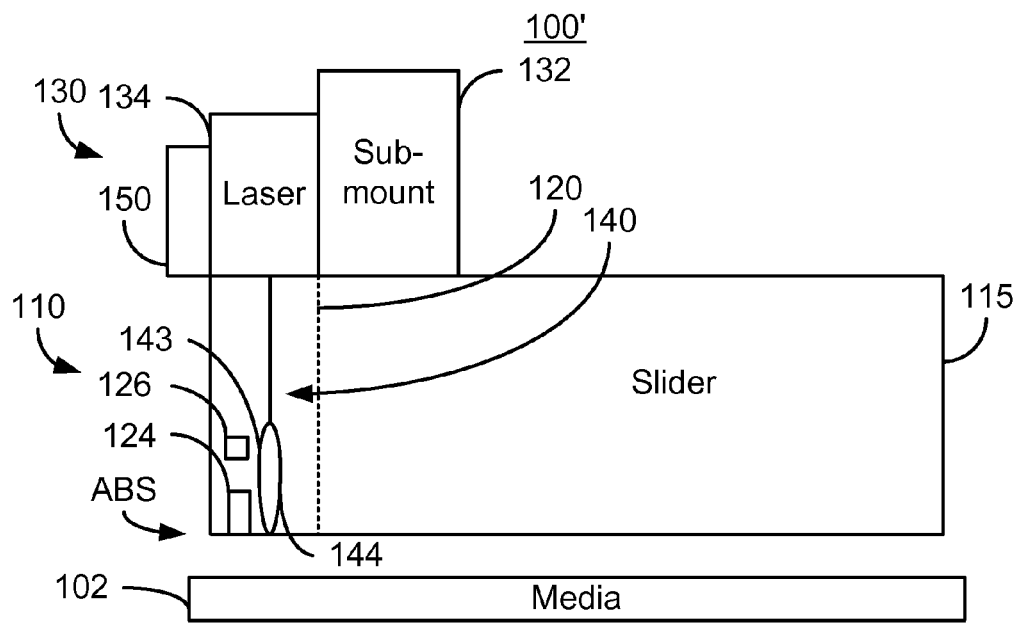
FIGS. 5A and 5B depict another exemplary embodiment of a HAMR disk drive.
Figure 5B:
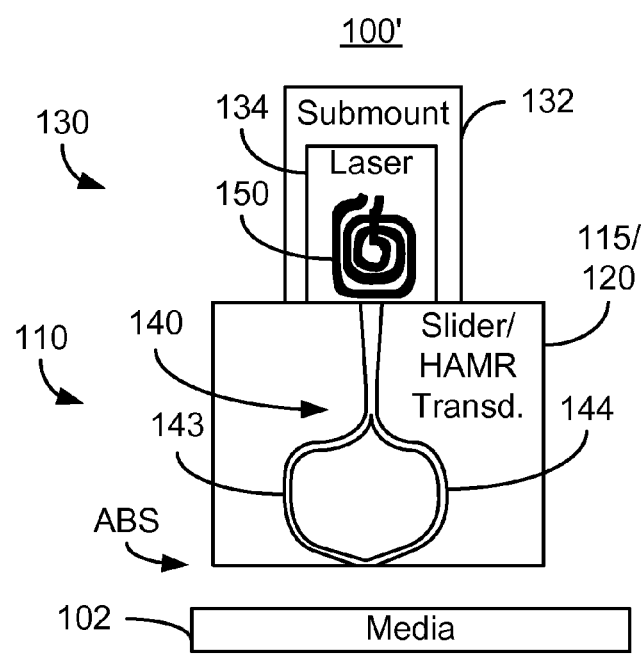

FIGS. 5A-5B depict an exemplary embodiment of a portion of a HAMR disk drive 100'. FIG. 5A depicts a side view of the HAMR disk drive 100'. FIG. 5B depicts a portion of the HAMR disk drive 100' including the waveguide 140. For clarity, FIGS. 5A-5B are not to scale. For simplicity not all portions of the HAMR disk drive 100' are shown. In addition, although the HAMR disk drive 100' is depicted in the context of particular components other and/or different components may be used.

The HAMR disk drive 100' is analogous to the HAMR disk drive 100. Consequently, analogous components have similar labels. The HAMR disk drive 100' includes media 102, a HAMR head 110, slider 115, HAMR transducer 120, write pole 124, coil(s) 126, IWG 140 including arms 143 and 144, and a laser assembly 130 including a laser 134 and submount 132 analogous to those shown in FIGS. 2-4C. Although not shown, the slider 115, and thus the laser assembly 130 and HAMR transducer 120 are generally attached to a suspension (not shown). The HAMR transducer 120 is fabricated on the slider 115 and includes an ABS proximate to the media 102 during use. In general, the HAMR head 120 includes a write transducer and a read transducer. However, for clarity, only the write portion of the HAMR head 120 is shown. In addition, the NFT has been eliminated from the HAMR disk drive 100'.

As can be seen in FIGS. 5A and 5B, the laser subassembly 130 also includes a heater 150 that may be formed as a resistive coil on the laser 134. Further, the arms 143 and 144 have a physical path difference. Increasing the temperature of the laser 134 using the heater 150 may change the wavelength of the light emitted by the laser 134. In some embodiments, a full $2\pi$ phase difference corresponding to a 235 nm node shift may be achieved by changing the laser temperature by ~10 degrees C. if the arm imbalance is equal to or greater than 170 μm. Moving the antinode 148 of FIGS. 1-4C by the misalignment shift discussed above may thus be accomplished. Thus, using the heater 150 the locations of the antinodes (not shown in FIGS. 5A-5B) may be adjusted.

Figure 6:
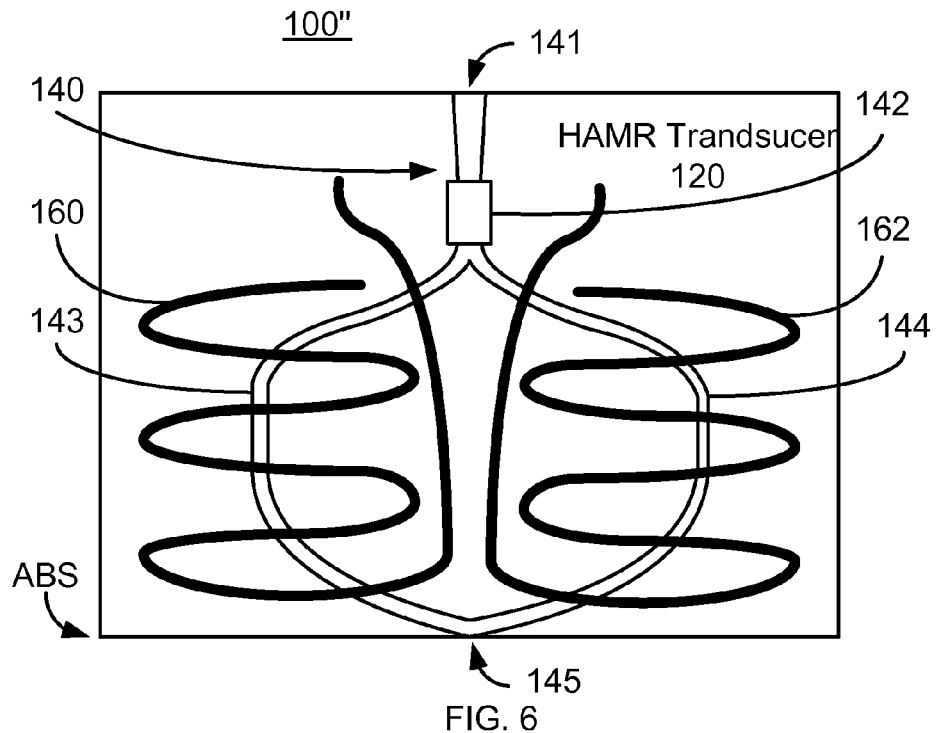
FIG. 6 depicts another exemplary embodiment of a HAMR disk drive.

FIG. 6 depicts an exemplary embodiment of a portion of a HAMR disk drive 100". FIG. 6 depicts a portion of the HAMR disk drive 100" including the waveguide 140. For clarity, FIG. 6 is not to scale. For simplicity not all portions of the HAMR disk drive 100" are shown. In addition, although the HAMR disk drive 100" is depicted in the context of particular components other and/or different components may be used.

The HAMR disk drive 100" is analogous to the HAMR disk drive(s) 100/100'. Consequently, analogous components have similar labels. The HAMR disk drive 100" includes media (not shown in FIG. 6), a HAMR head (not specifically labeled in FIG. 6), a slider 115 (not specifically labeled in FIG. 6), HAMR transducer 120, write pole (not shown in FIG. 6), coil(s) (not specifically labeled in FIG. 6), IWG 140 including entrance 141, recombination region 145 and arms 143 and 144, and a laser assembly (not specifically labeled in FIG. 6) including a laser (not specifically labeled in FIG. 6) and submount (not specifically labeled in FIG. 6) analogous to those shown in FIGS. 2-5B. For clarity, the cladding is not expressly depicted in FIG. 6. Although not shown, the slider, and thus the laser assembly and HAMR transducer 120 are generally attached to a suspension (not shown). The HAMR transducer 120 is fabricated on the slider and includes an ABS proximate to the media during use. In general, the HAMR head 120 includes a write transducer and a read transducer. However, for clarity, only the write portion of the HAMR head 120 is shown. In addition, the NFT has been eliminated from the HAMR disk drive 100".

As can be seen in FIG. 6, the HAMR transducer 120 also includes heater(s) 160 and 162. In some embodiments, only one of the heaters 160 and 162 may be included and/or used. In other embodiments, both heaters 160 and 162 may be included and used. In some embodiments, therefore, the heaters 160 and 162 may be independently controlled. The heaters 160 and 162 may be used to adjust the optical path lengths of the arms 143 and 144, respectively. In particular, the heaters heat the region around the arms 143 and 144. Heating the region around the arms 143 and 144 may change the length of the arms 143 and 144 via thermal expansion. Thus, the phase difference and antinode (not shown in FIG. 6) position may be shifted. Heating the arm 143 only may shift the antinode to the left (toward the arm 143). Heating only the arm 144 only may shift the antinode toward the right (toward the arm 144). Thus, the positions of the antinodes may be shifted using the heater(s) 160 and/or 162. For example, assuming that $\delta$ is the desired shift in the antinode position, the waveguide arm length should be greater than or equal to $\delta/(\kappa\Delta T)$ where $\kappa$ is linear thermal expansion coefficient and $\Delta T$ is allowed temperature difference. For $\kappa \sim 10^{-5}$ (most metals), $\Delta T=10$ C and $\delta \sim 54$ nm, length of each arm 143 and 144 would be around 250 μm (total length of the two arms 500 μm). This arm length would fit on the slider 115. For $\delta=20$ nm, the arms 143 and 144 may each be approximately 100 μm. Note, however, that the change in temperature may also change the index of refraction of portions of the waveguide 140. This change may be accounted for in determining the position of the antinodes. Thus, the HAMR disk drive 100" may be heated to shift the position of the antinode.

Figure 7:
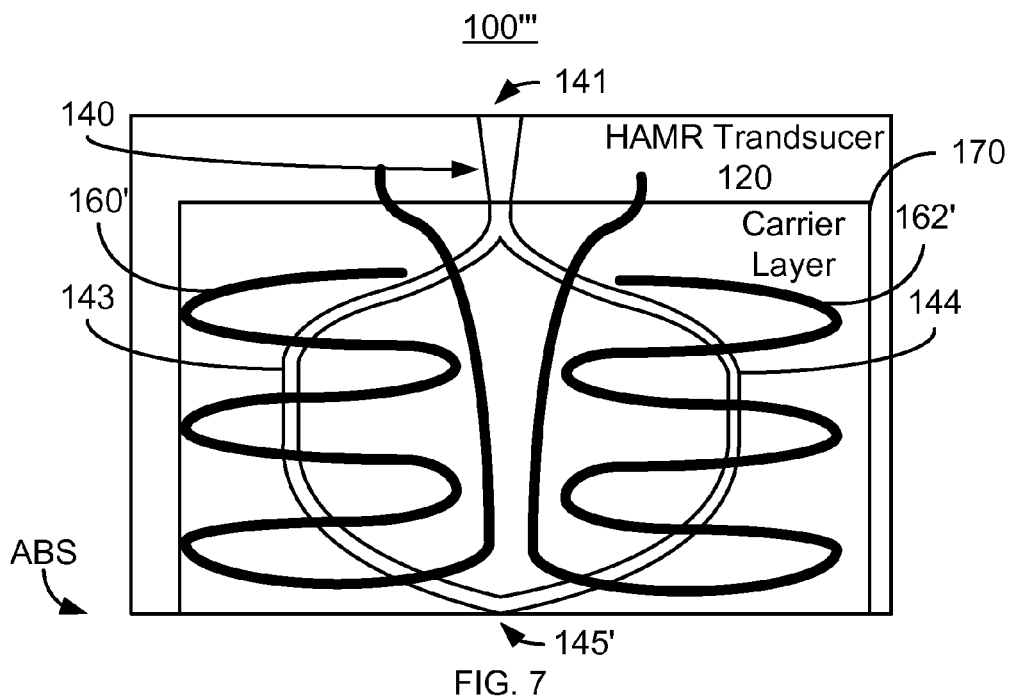
FIG. 7 depicts another exemplary embodiment of a HAMR disk drive.

FIG. 7 depicts an exemplary embodiment of a portion of a HAMR disk drive 100'''. FIG. 7 depicts a portion of the HAMR disk drive 100''' including the waveguide 140. For clarity, FIG. 7 is not to scale. For simplicity not all portions of the HAMR disk drive 100''' are shown. In addition, although the HAMR disk drive 100''' is depicted in the context of particular components other and/or different components may be used.

The HAMR disk drive 100''' is analogous to the HAMR disk drive(s) 100/100'/100". Consequently, analogous components have similar labels. The HAMR disk drive 100''' includes media (not shown in FIG. 7), a HAMR head (not specifically labeled in FIG. 7), a slider 115 (not specifically labeled in FIG. 7), HAMR transducer 120, write pole (not shown in FIG. 7), coil(s) (not specifically labeled in FIG. 7), IWG 140 including entrance 141, recombination region 145 and arms 143 and 144, and a laser assembly (not specifically labeled in FIG. 7) including a laser (not specifically labeled in FIG. 7) and submount (not specifically labeled in FIG. 7) analogous to those shown in FIGS. 2-6. Although not shown, the slider, and thus the laser assembly and HAMR transducer 120 are generally attached to a suspension (not shown). The HAMR transducer 120 is fabricated on the slider and includes an ABS proximate to the media during use. In general, the HAMR head 120 includes a write transducer and a read transducer. However, for clarity, only the write portion of the HAMR head 120 is shown. In addition, the NFT has been eliminated from the HAMR disk drive 100'''.

As can be seen in FIG. 7, the HAMR transducer 120 includes heater(s) 160' and 162' that are analogous to the heaters 160 and 162 depicted in FIG. 6. In addition, a carrier substrate 170. The carrier layer 170 may be formed of a material having a high thermal expansion material. More specifically, the carrier layer 170 may have a higher coefficient of thermal expansion than the core and cladding for the IWG 140. Further, the carrier layer 170 may be substantially thicker than the waveguide 140/cladding. Such a layer 170 may more efficiently stretch the waveguide by 140 through heating. Thus, the positions of the antinodes may be shifted using the heaters 160' and 162' in an analogous manner to the shift using the heaters 160 and 162.

Figure 8:
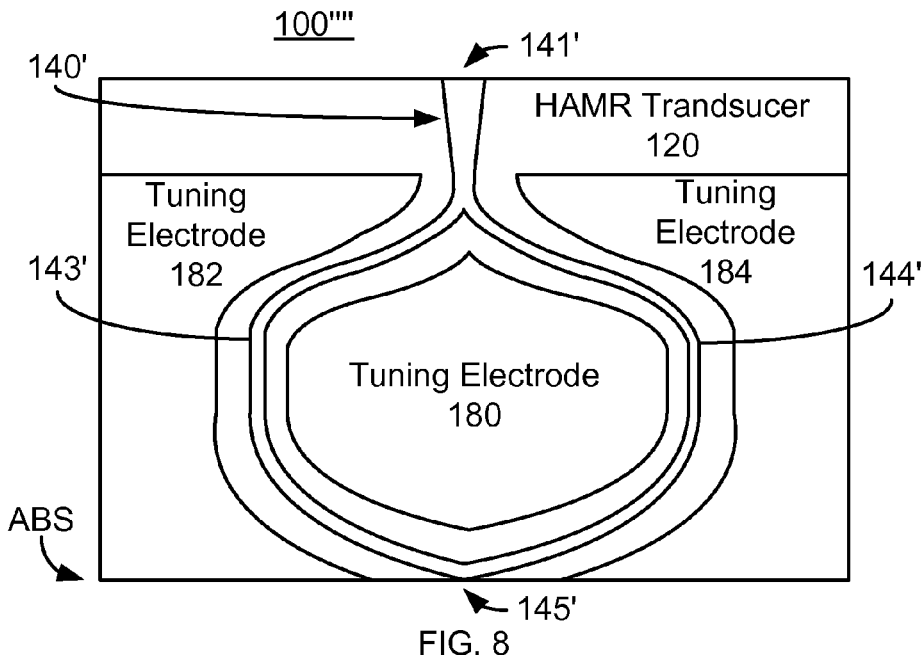
FIG. 8 depicts another exemplary embodiment of a HAMR disk drive.

FIG. 8 depicts an exemplary embodiment of a portion of a HAMR disk drive 100"". FIG. 8 depicts a portion of the HAMR disk drive 100"" including the waveguide 140. For clarity, FIG. 8 is not to scale. For simplicity not all portions of the HAMR disk drive 100"" are shown. In addition, although the HAMR disk drive 100'''' is depicted in the context of particular components other and/or different components may be used.

The HAMR disk drive 100'''' is analogous to the HAMR disk drive(s) 100/100'/100''/100'''. Consequently, analogous components have similar labels. The HAMR disk drive 100'''' includes media (not shown in FIG. 8), a HAMR head (not specifically labeled in FIG. 8), a slider 115 (not specifically labeled in FIG. 8), HAMR transducer 120, write pole (not shown in FIG. 8), coil(s) (not specifically labeled in FIG. 8), IWG 140' including entrance 141', recombination region 145' and arms 143' and 144', and a laser assembly (not specifically labeled in FIG. 8) including a laser (not specifically labeled in FIG. 8) and submount (not specifically labeled in FIG. 8) analogous to those shown in FIGS. 2-7. Although not shown, the slider, and thus the laser assembly and HAMR transducer 120 are generally attached to a suspension (not shown). The HAMR transducer 120 is fabricated on the slider and includes an ABS proximate to the media during use. In general, the HAMR head 120 includes a write transducer and a read transducer. However, for clarity, only the write portion of the HAMR head 120 is shown. In addition, the NFT has been eliminated from the HAMR disk drive 100''''.

The IWG 140' is formed of an electro-optic material. More specifically, at least part of the arm(s) 143' and/or 144' includes an electro optic material. The HAMR disk drive 100'''' also includes tuning electrodes 180, 182, and 184. In other embodiments, another number of tuning electrodes may be provided. Using the tuning electrodes 180, 182 and 184, voltage(s) maybe provided across the arm 143' and/or 144'. As a result, the index of refraction of the arm 143' and/or 144' may be changed. The optical path length depends upon the physical length as well as the index of refraction. A change in the index of refraction may, therefore, result in a change in the optical path length. Thus, the position of the antinodes may be tuned.

Figure 9:
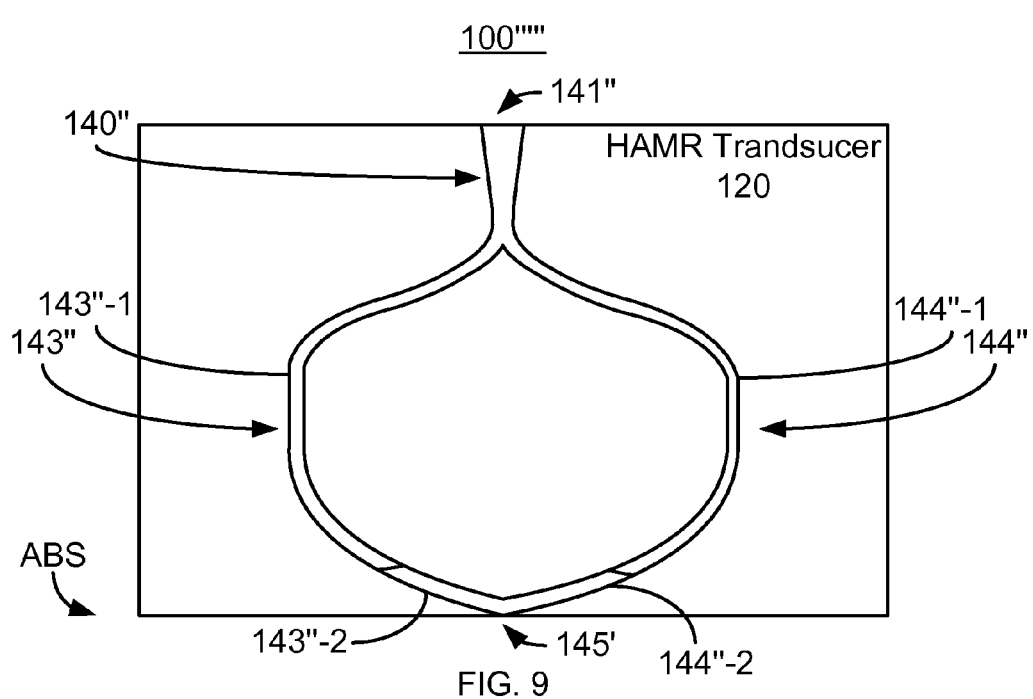
FIG. 9 depicts another exemplary embodiment of a HAMR disk drive.

FIG. 9 depicts an exemplary embodiment of a portion of a HAMR disk drive 100''''. FIG. 9 depicts a portion of the HAMR disk drive 100'''' including the waveguide 140. For clarity, FIG. 9 is not to scale. For simplicity not all portions of the HAMR disk drive 100'''' are shown. In addition, although the HAMR disk drive 100'''' is depicted in the context of particular components other and/or different components may be used.

The HAMR disk drive 100'''' is analogous to the HAMR disk drive(s) 100/100'/100''/100'''/100''''. Consequently, analogous components have similar labels. The HAMR disk drive 100'''' includes media (not shown in FIG. 9), a HAMR head (not specifically labeled in FIG. 9), a slider (not specifically labeled in FIG. 9), HAMR transducer 120, write pole (not shown in FIG. 9), coil(s) (not specifically labeled in FIG. 9), IWG 140'' including entrance 141'', recombination region 145'' and arms 143'' and 144'', and a laser assembly (not specifically labeled in FIG. 9) including a laser (not specifically labeled in FIG. 9) and submount (not specifically labeled in FIG. 9) analogous to those shown in FIGS. 2-8. Although not shown, the slider, and thus the laser assembly and HAMR transducer 120 are generally attached to a suspension (not shown). The HAMR transducer 120 is fabricated on the slider and includes an ABS proximate to the media during use. In general, the HAMR head 120 includes a write transducer and a read transducer. However, for clarity, only the write portion of the HAMR head 120 is shown. In addition, the NFT has been eliminated from the HAMR disk drive 100''''.

In the embodiment shown, a portion of each of the arms 143'' and 144'' includes or consists of a birefringent material. For example, in some embodiments, regions 143'-2 and 144''-2 include the birefringent material. The regions 143''-1 and 144''-1 may not include a birefringent material. In other embodiments, all of the arm(s) 143'' and/or 144'' are formed of the birefringent material. As discussed above, use of a birefringent material may allow for the antinode/spot at the media to have improved confinement in the down track or cross track direction. Further, the spacing between the antinodes may be optimized. Thus, the HAMR disk drive 100'''' may have improved performance. Various features are highlighted in the HAMR disk drives 100, 100', 100'', 100''', 100'''' and/or 100'''''. However, one or more of the characteristics of the HAMR disk drives 100, 100', 100'', 100''', 100'''' and/or 100''''' may be combined in other embodiments.

Figure 10:
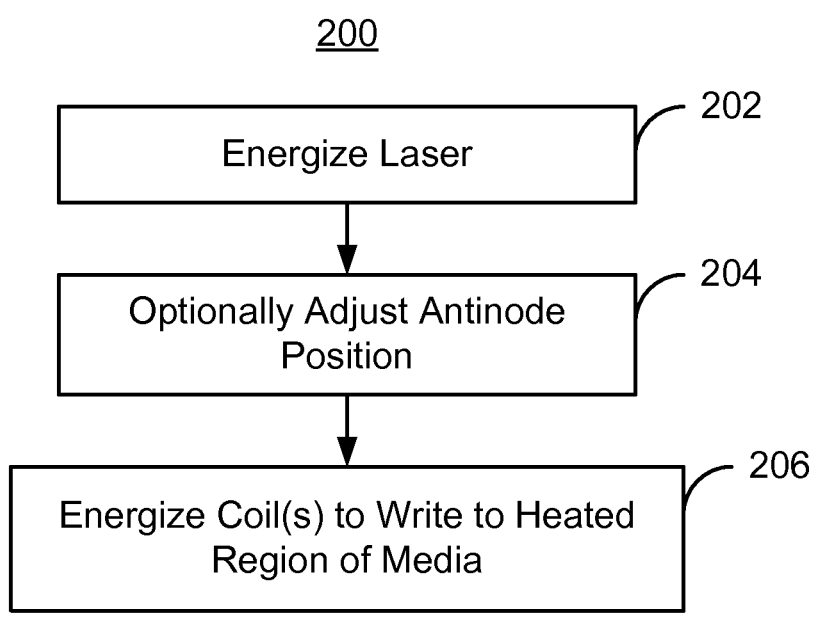
FIG. 10 is a flow chart depicting an exemplary embodiment of a method for recording data using an exemplary embodiment of a HAMR disk drive.

FIG. 10 is a flow chart depicting an exemplary embodiment of a method 200 for writing using a HAMR transducer. For simplicity, some steps may be omitted, performed in another order, interleaved with other steps and/or combined. The method 200 is described in the context of the HAMR transducer 120 in a HAMR disk drive 100. However, the method 200 may be used with other disk drives including but not limited to the disk drives 100', 100'', 100''', 100'''' and/or 100'''''.

The laser 134 is energized, via step thus, the light energy from the laser 134 is optically coupled to the IWG entrance 141, split into the arms 143 and 144 and provided to the recombination region 145. As a result, a standing wave with antinodes 148 is formed.

The position(s) of the antinodes 148 may optionally be adjusted, via step 204. Step 204 may include heating the laser, heating the IWG 140, and/or otherwise adjusting the difference between the optical path lengths of the arms 143 and 144. Thus, the antinode 148 used to write to the media may have the desired location with respect to the components of the transducer 120 and/or the media 102.

The coil 126 is energized, via step 206. As a result, a magnetic field is developed in the write pole 124 and the desired region of the media 102 may be written. Using the method 200, the drives HAMR disk drives 100, 100', 100'', 100''', 100'''' and/or 100''''' may record data. Consequently, the benefits of the HAMR disk drives 100, 100', 100'', 100''', 100'''' and/or 100''''' may be realized.

We claim:

1. A heat assisted magnetic recording (HAMR) head coupled with a laser for providing energy and having an air-bearing surface (ABS) configured to reside in proximity to a media during use, the HAMR head comprising:
   a slider coupled with the laser; and
   a HAMR transducer coupled with the slider, the HAMR transducer including a write pole configured to write to a region of the media, at least one coil for energizing the write pole and an interferometric waveguide (IWG) optically coupled with the laser, the IWG including a splitter, a recombination region and a plurality of arms between the splitter and the recombination region, the plurality of arms having a plurality of optical path lengths, the IWG being configured to provide the energy from the laser to the media without an intervening near-field transducer by forming an interference pattern in the recombination region, an antinode of the interference pattern being at a region of the media and heating the region of the media for a write operation.

2. The HAMR head of claim 1 wherein the write pole has a leading edge and wherein the antinode is aligned with the leading edge.

3. A heat assisted magnetic recording (HAMR) head coupled with a laser for providing energy and having an air-bearing surface (ABS) configured to reside in proximity to a media during use, the HAMR head comprising:
- a slider coupled with the laser; and
- a HAMR transducer coupled with the slider, the HAMR transducer including a write pole configured to write to a region of the media, at least one coil for energizing the write pole and an interferometric waveguide (IWG) optically coupled with the laser, the IWG including a splitter, a recombination region and a plurality of arms between the splitter and the recombination region, the plurality of arms having a plurality of optical path lengths, the IWG being configured to provide the energy from the laser to the media by forming an interference pattern in the recombination region, an antinode of the interference pattern being at a region of the media and heating the region of the media for a write operation;
- wherein the HAMR head is configured to reversibly adjust at least a portion of the plurality optical path lengths such that at least one optical path difference between the plurality of arms and a location of the antinode with respect to the write pole are tunable during operation of the HAMR head.

4. The HAMR head of claim 3 wherein the HAMR head is configured to adjust the at least the portion of the plurality of optical path lengths by adjusting a portion of a plurality of physical path lengths corresponding to the plurality of optical path lengths.

5. The HAMR head of claim 3 wherein the HAMR head is configured to adjust the at least a portion of the plurality optical path lengths by adjusting at least one index of refraction corresponding to the plurality of optical path lengths.

6. The HAMR head of claim 3 further wherein the HAMR head further includes a heater in proximity to the laser, the heater for adjusting a wavelength of the energy from the laser.

7. The HAMR head of claim 3 further comprising:
- at least one heater in proximity to at least one of the plurality of arms, the heater changing at least one optical path length of the at least one of the plurality of arms.

8. The HAMR head of claim 7 wherein the IWG has a first coefficient of thermal expansion and wherein the HAMR head further includes:
- a carrier layer for at least a portion of the IWG, the carrier substrate having a second coefficient of thermal expansion greater than the first coefficient of thermal expansion.

9. The HAMR head of claim 3 wherein at least a portion of the IWG includes at least one electro-optic material and wherein the HAMR head further includes:
- at least one tuning electrode configured to provide at least one voltage across the IWG, thereby changing at one index of refraction of the at least one electro-optic material.

10. The HAMR head of claim 3 wherein at least a portion of the IWG includes at least one birefringent material.

11. The HAMR head of claim 3 wherein the write pole has an edge and wherein HAMR head is configured to tune the location of the antinode such that the is aligned with the edge.

12. The HAMR head of claim 3 wherein the IWG includes a core having an index of refraction greater than 2.2.

13. A heat assisted magnetic recording (HAMR) head coupled with a laser for providing energy and having an air-bearing surface (ABS) configured to reside in proximity to a media during use, the HAMR head comprising:
- a slider coupled with the laser; and
- a HAMR transducer coupled with the slider, the HAMR transducer including a write pole configured to write to a region of the media, at least one coil for energizing the write pole and an interferometric waveguide (IWG) optically coupled with the laser, the IWG including a splitter, a recombination region and a plurality of arms between the splitter and the recombination region, the plurality of arms having a plurality of optical path lengths, the IWG being configured to provide the energy from the laser to the media by forming an interference pattern in the recombination region, an antinode of the interference pattern being at a region of the media and heating the region of the media for a write operation;
- wherein the energy from the laser has a wavelength less than 500 nm.

14. A heat assisted magnetic recording (HAMR) disk drive comprising:
- a media for storing data;
- a slider having an air-bearing surface (ABS) configured to reside in proximity to the media during use;
- a laser coupled with the slider for providing energy; and
- a HAMR transducer coupled with the slider, the HAMR transducer including a write pole configured to write to a region of the media, at least one coil for energizing the write pole and an interferometric waveguide (IWG) optically coupled with the laser, the IWG including a splitter, a recombination region and a plurality of arms between the splitter and the recombination region, the plurality of arms having a plurality of optical path lengths, the IWG being configured to provide the energy from the laser to the media by forming an interference pattern in the recombination region, an antinode of the interference pattern being at the media and heating the media for a write operation;
- wherein the HAMR disk drive is free of a near-field transducer.

15. A method for writing to a media using a heat assisted magnetic recording (HAMR) head coupled with a laser for providing energy, the HAMR head including a slider having an air-bearing surface (ABS) configured to reside in proximity to a media during use and a HAMR transducer, the HAMR transducer including a write pole configured to write to a region of the media, at least one coil for energizing the write pole and an interferometric waveguide (IWG) optically coupled with the laser, the IWG including a splitter, a recombination region and a plurality of arms between the splitter and the recombination region the method comprising:
- energizing the laser to provide the energy, the plurality of arms having a plurality of optical path lengths such that the IWG is configured to provide the energy from the laser to the media by forming an interference pattern in the recombination region without traversing a near-field transducer between the IWG and the media, an antinode of the interference pattern being at the media and heating a region of the media for a write operation; and
- energizing the at least one coil such that the write pole writes to the region of the media.

16. The method of claim 15 wherein the write pole has a leading edge and wherein the antinode is aligned with the leading edge.

17. A method for writing to a media using a heat assisted magnetic recording (HAMR) head coupled with a laser for providing energy, the HAMR head including a slider having an air-bearing surface (ABS) configured to reside in proximity to a media during use and a HAMR transducer, the HAMR transducer including a write pole configured to write to a region of the media, at least one coil for energizing the write pole and an interferometric waveguide (IWG) optically coupled with the laser, the IWG including a splitter, a recombination region and a plurality of arms between the splitter and the recombination region the method comprising:
  energizing the laser to provide the energy, the plurality of arms having a plurality of optical path lengths such that the IWG is configured to provide the energy from the laser to the media by forming an interference pattern in the recombination region, an antinode of the interference pattern being at the media and heating a region of the media for a write operation; and
  energizing the at least one coil such that the write pole writes to the region of the media;
  reversibly adjusting at least a portion of the plurality optical path lengths during operation of the HAMR head such that at least one optical path difference between the plurality of arms and a location of the antinode with respect to the write pole are tunable during operation of the HAMR head.

18. The method of claim 17 further wherein the HAMR head further includes a heater in proximity to the laser and wherein the step of adjusting the at least the portion of the plurality of optical path lengths includes:
  energizing the heater to change a wavelength of the energy from the laser.

19. The method of claim 17 wherein the HAMR head includes at least one heater in proximity to at least one of the plurality of arms, the heater changing at least one optical path length of the at least one of the plurality of arms, the adjusting step further including:
  energizing the heater to change the at least one optical path length of the at least one of the plurality of arms.

20. The method of claim 17 wherein at least a portion of the IWG includes at least one electro-optic material, wherein the HAMR head further includes at least one tuning electrode configured to provide at least one voltage across the IWG and wherein the adjusting step further includes:
  providing the at least one voltage across the IWG, thereby changing at one index of refraction of the at least one electro-optic material.

21. The method of claim 17 wherein at least a portion of the IWG includes at least one birefringent material.

22. A method for writing to a media using a heat assisted magnetic recording (HAMR) head coupled with a laser for providing energy, the HAMR head including a slider having an air-bearing surface (ABS) configured to reside in proximity to a media during use and a HAMR transducer, the HAMR transducer including a write pole configured to write to a region of the media, at least one coil for energizing the write pole and an interferometric waveguide (IWG) optically coupled with the laser, the IWG including a splitter, a recombination region and a plurality of arms between the splitter and the recombination region the method comprising:
  energizing the laser to provide the energy, the plurality of arms having a plurality of optical path lengths such that the IWG is configured to provide the energy from the laser to the media by forming an interference pattern in the recombination region, an antinode of the interference pattern being at the media and heating a region of the media for a write operation; and
  energizing the at least one coil such that the write pole writes to the region of the media;
  wherein the energy from the laser has a wavelength less than 500 nm.

* * * * *